US012776011B2

(12) United States Patent
Piuze-Phaneuf

(10) Patent No.: US 12,776,011 B2
(45) Date of Patent: Oct. 27, 2026

(54) PERSPECTIVE CORRECTION WITH GRAVITATIONAL SMOOTHING

(71) Applicant: Apple Inc., Cupertino, CA (US)

(72) Inventor: Emmanuel Piuze-Phaneuf, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 493 days.

(21) Appl. No.: 18/241,629

(22) Filed: Sep. 1, 2023

(65) Prior Publication Data

US 2024/0078640 A1 Mar. 7, 2024

Related U.S. Application Data

(60) Provisional application No. 63/403,050, filed on Sep. 1, 2022.

(51) Int. Cl.
*G06T 5/70* (2024.01)
*G06T 5/20* (2006.01)
*G06T 7/50* (2017.01)

(52) U.S. Cl.
CPC .................. *G06T 5/70* (2024.01); *G06T 5/20* (2013.01); *G06T 7/50* (2017.01)

(58) Field of Classification Search
CPC ............ G06T 5/70; G06T 7/50; H04N 13/111
See application file for complete search history.

(56) References Cited

U.S. PATENT DOCUMENTS 8,599,403 B2 * 12/2013 Redert .................... G06T 7/529 348/42
8,744,210 B2 * 6/2014 Noda ........................ G06T 5/20 358/525
10,832,427 B1 * 11/2020 Eble ........................ G06F 17/16
2011/0032341 A1 * 2/2011 Ignatov ................ H04N 13/144 348/42
2013/0009952 A1 * 1/2013 Tam .......................... G06T 7/13 345/419
2013/0202191 A1 * 8/2013 Wang .................. H04N 13/111 382/154
2019/0101758 A1 * 4/2019 Zhu .......................... G06T 3/00

(Continued)

FOREIGN PATENT DOCUMENTS

WO WO-2022005707 A1 * 1/2022 ............ G02B 27/01

OTHER PUBLICATIONS

Liang Zhang et al., "Stereoscopic Image Generation Based on Depth Images for 3D TV," IEEE Transactions on Broadcasting, vol. 51, No. 2, Jun. 2005, pp. 191-199.

*Primary Examiner* — Ted W Barnes
(74) *Attorney, Agent, or Firm* — Fernando & Partners, LLP

(57) ABSTRACT

In one implementation, a method of performing perspective correction is performed by a device including an image sensor, a display, one or more processors, and non-transitory memory. The method includes capturing, using the image sensor, an image of a physical environment. The method includes obtaining a depth map including a plurality of depths respectively associated with a plurality of pixels of the image of the physical environment. The method includes smoothing the depth map based on a world-fixed vector. The method includes transforming, using the one or more processors, the image of the physical environment based on the smoothed depth map. The method includes displaying, on the display, the transformed image.

20 Claims, 14 Drawing Sheets

(56) References Cited

U.S. PATENT DOCUMENTS

| | | | | |
|---|---|---|---|---|
| 2020/0311876 | A1* | 10/2020 | Senzaki | G06T 5/70 |
| 2021/0019898 | A1* | 1/2021 | Eble | G06F 17/16 |
| 2021/0233313 | A1* | 7/2021 | Noris | G06T 19/006 |

* cited by examiner

PERSPECTIVE CORRECTION WITH GRAVITATIONAL SMOOTHING

CROSS-REFERENCE TO RELATED APPLICATIONS

This application claims priority to U.S. Provisional Patent App. No. 63/403,050, filed on Sep. 1, 2022, which is hereby incorporated by reference in its entirety.

TECHNICAL FIELD

The present disclosure generally relates to systems, methods, and devices for performing perspective correction with world-fixed smoothing.

BACKGROUND

In various implementations, an extended reality (XR) environment is presented by a head-mounted device (HMD). Various HMDs include a scene camera that captures an image of the physical environment in which the user is present (e.g., a scene) and a display that displays the image to the user. In some instances, this image or portions thereof can be combined with one or more virtual objects to present the user with an XR experience. In other instances, the HMD can operate in a pass-through mode in which the image or portions thereof are presented to the user without the addition of virtual objects. Ideally, the image of the physical environment presented to the user is substantially similar to what the user would see if the HMD were not present. However, due to the different positions of the eyes, the display, and the camera in space, this may not occur, resulting in impaired distance perception, disorientation, and poor hand-eye coordination.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
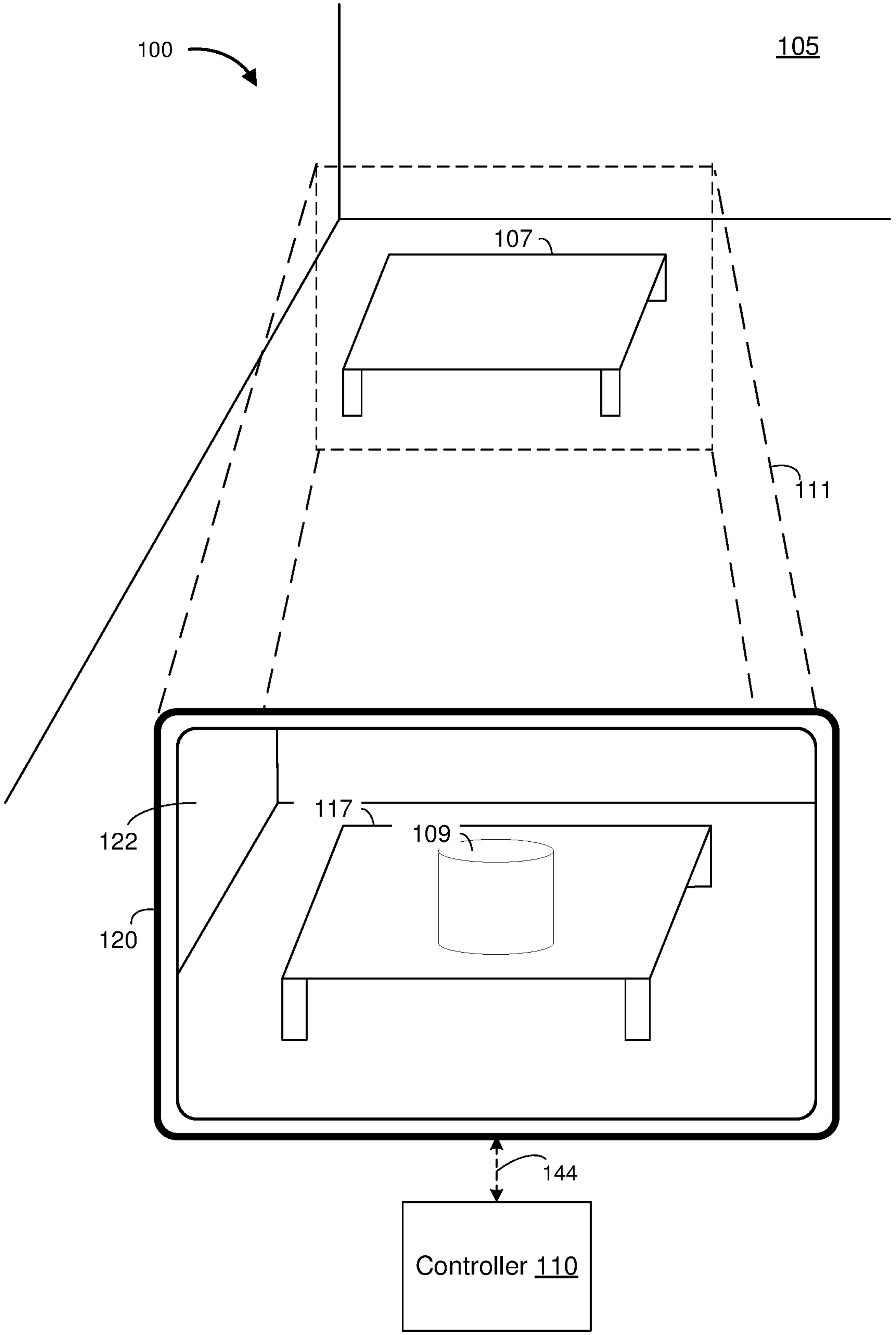
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for performing perspective correction. In various implementations, the method is performed by a device including an image sensor, a display, one or more processors, and non-transitory memory. The method includes capturing, using the image sensor, an image of a physical environment. The method includes obtaining a depth map including a plurality of depths respectively associated with a plurality of pixels of the image of the physical environment. The method includes smoothing the depth map based on a world-fixed vector. The method includes transforming, using the one or more processors, the image of the physical environment based on the smoothed depth map. The method includes displaying, on the display, the transformed image.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As described above, in an HMD with a display and a scene camera, the image of the physical environment presented to the user on the display may not always reflect what the user would see if the HMD were not present due to the different positions of the eyes, the display, and the camera in space. In various circumstances, this results in poor distance perception, disorientation of the user, and poor hand-eye coordination, e.g., while interacting with the physical environment. Thus, in various implementations, images from the scene camera are transformed such that they appear to have been captured at the location of the user's eyes using a depth map representing, for each pixel of the image, the distance from the camera to the object represented by the pixel. In various implementations, images from the scene camera are partially transformed such that they appear to have been captured at a location closer to the location of the user's eyes than the location of the scene camera in one or more dimensions.

In various implementations, the depth map is altered to reduce artifacts. For example, in various implementations, the depth map is smoothed so as to avoid holes in the transformed image. In various implementations, the depth map is smoothed more in one dimension (e.g., vertically) than in another direction (e.g., horizontally). However, in various implementations, to ensure dynamic stability and reduce temporal artifacts, the corresponding depth map for each of a series of images is maximally smoothed in a world-fixed direction, such as a direction corresponding to a gravity vector. Thus, the direction, in image space, of maximal smoothing of the depth maps of two images from two different perspectives differs, but each direction corresponds to the same world-fixed vector.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 13. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 14.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
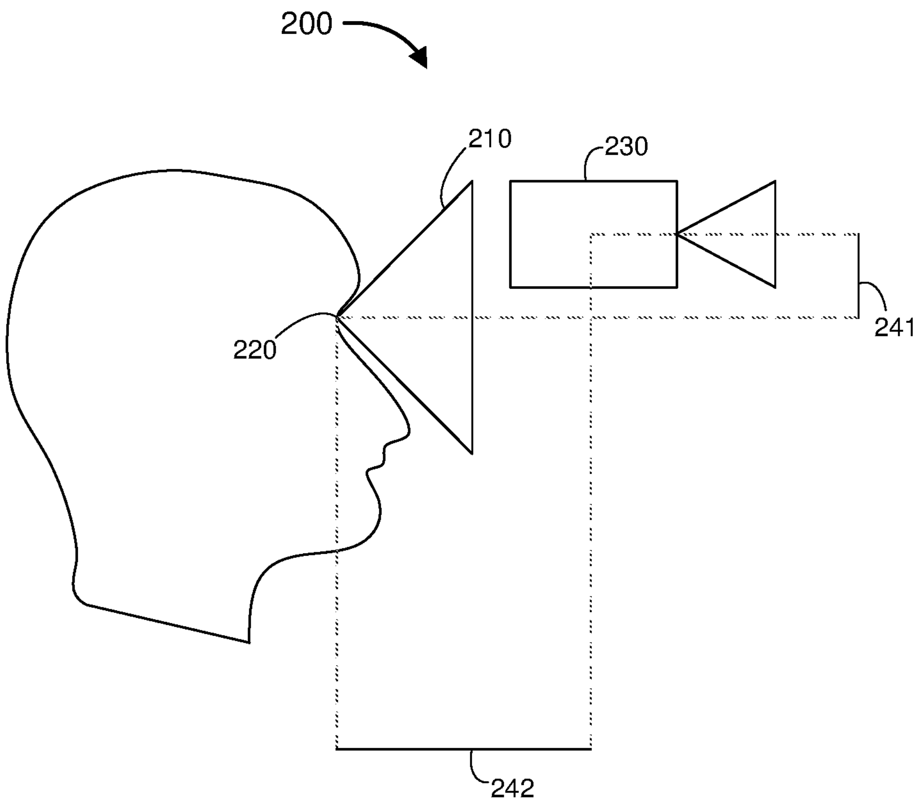
FIG. 2 illustrates an example scenario related to capturing an image of physical environment and displaying the captured image in accordance with some implementations.

FIG. 2 illustrates an example scenario 200 related to capturing an image of an environment and displaying the captured image in accordance with some implementations. A user wears a device (e.g., the electronic device 120 of FIG. 1) including a display 210 and an image sensor 230. The image sensor 230 captures an image of a physical environment and the display 210 displays the image of the physical environment to the eyes 220 of the user. The image sensor 230 has a perspective that is offset vertically from the perspective of the user (e.g., where the eyes 220 of the user are located) by a vertical offset 241. Further, the perspective of the image sensor 230 is offset longitudinally from the perspective of the user by a longitudinal offset 242. Further, in various implementations, the perspective of the image sensor 230 is offset laterally from the perspective of the user by a lateral offset (e.g., into or out of the page in FIG. 2).

Figure 3:
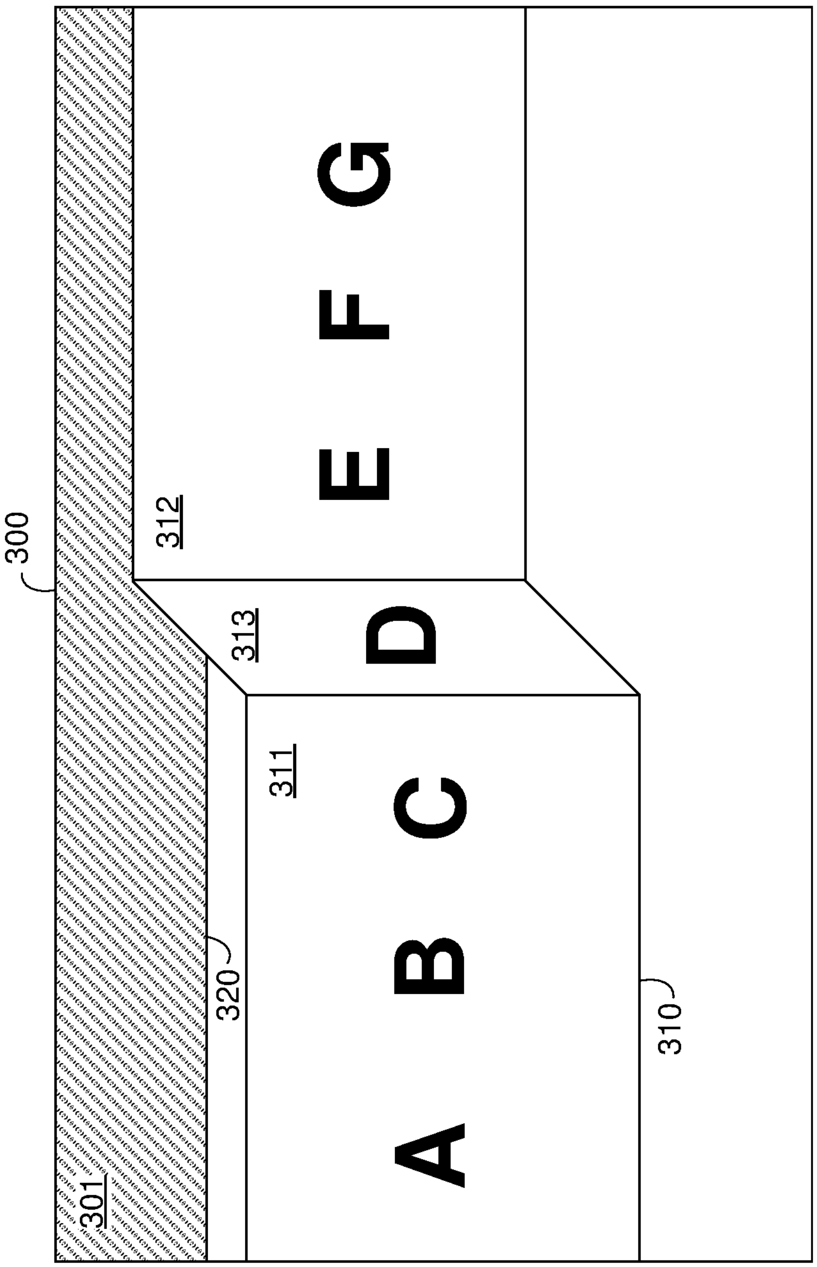
FIG. 3 is an image of physical environment captured by an image sensor from a particular perspective.

FIG. 3 is an image 300 of a physical environment 301 captured by an image sensor from a particular perspective. The physical environment 301 includes a structure 310 having a first surface 311 nearer to the image sensor, a second surface 312 further from the image sensor, and a third surface 313 connecting the first surface 311 and the second surface 312. The first surface 311 has the letters A, B, and C painted thereon, the third surface 313 has the letter D painted thereon, and the second surface 312 has the letters E, F, and G painted thereon.

From the particular perspective, the image 300 includes all of the letters painted on the structure 310. However, from other perspectives, as described below, a captured image may not include all the letters painted on the structure 310.

The physical environment 301 further includes a wall 320 behind (further from the image sensor) the structure 310.

Figure 4:
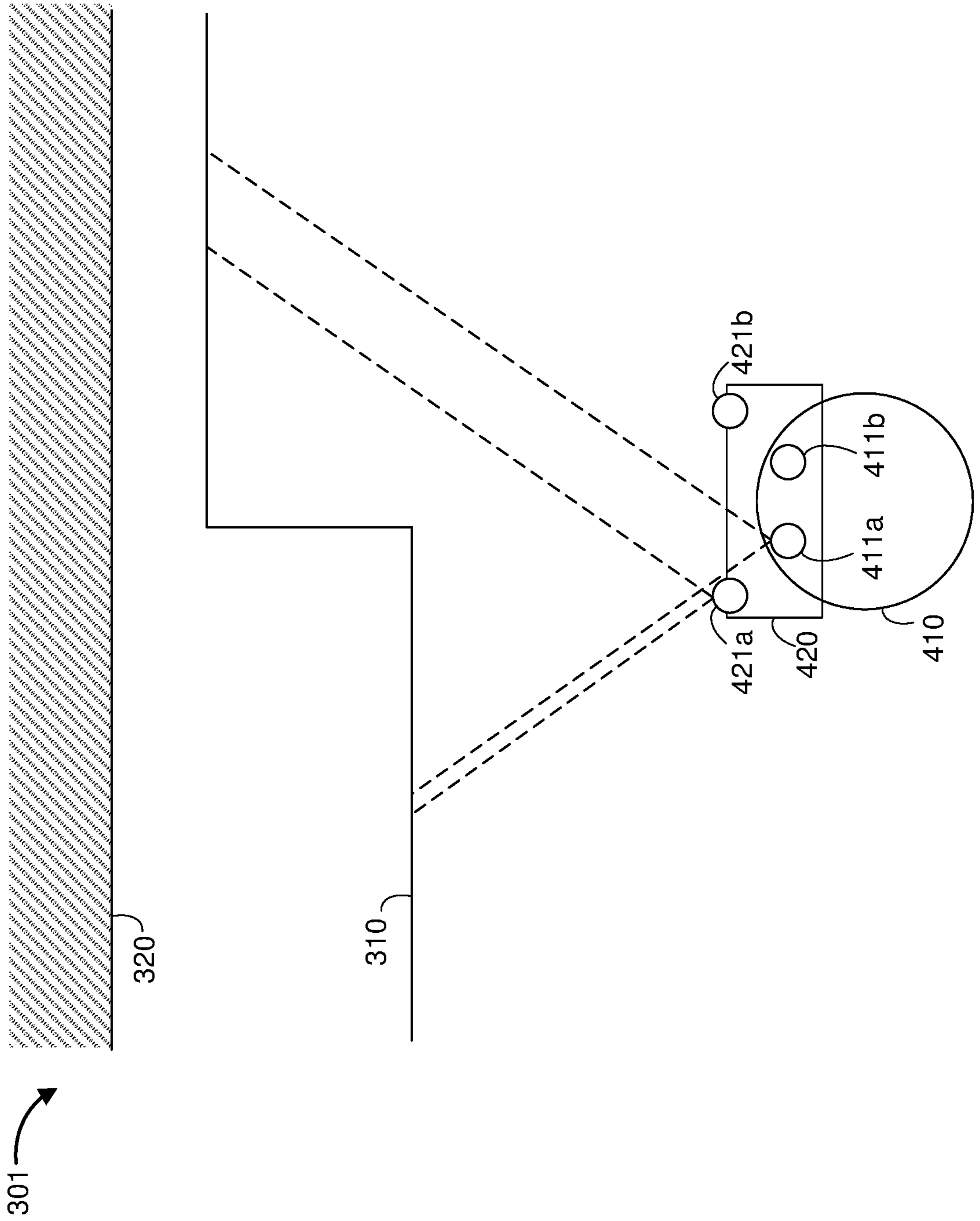
FIG. 4 is an overhead perspective view of the physical environment of FIG. 3.

FIG. 4 is an overhead perspective view of the physical environment 301 of FIG. 3. The physical environment 301 includes the structure 310, the wall 320, and a user 410 wearing an HMD 420. The user 410 has a left eye 411*a* at a left eye location providing a left eye perspective. The user 410 has a right eye 411*b* at a right eye location providing a right eye perspective. The HMD 420 includes a left image sensor 421*a* at a left image sensor location providing a left image sensor perspective. The HMD 420 includes a right image sensor 421*b* at a right image sensor location providing a right image sensor perspective. Because the left eye 411*a* of the user 410 and the left image sensor 421*a* of the HMD 420 are at different locations, they each provide different perspectives of the physical environment.

Figure 5A:
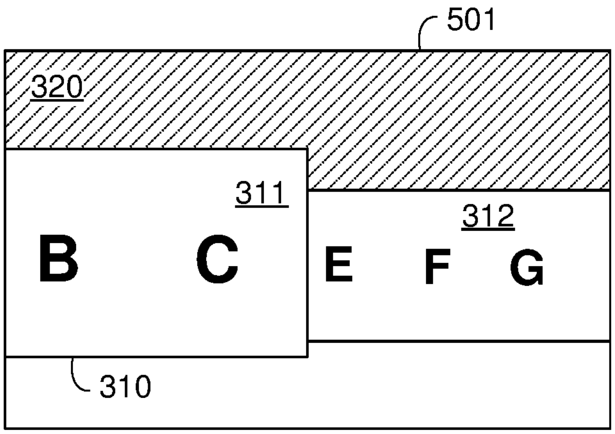
FIG. 5A illustrates a view of the physical environment of FIG. 3 as would be seen by a left eye of a user if the user were not wearing an HMD.

FIG. 5A illustrates a view 501 of the physical environment 301 as would be seen by the left eye 411*a* of the user 410 if the user 410 were not wearing the HMD 420. In the view 501, the first surface 311 and the second surface 312 are present, but the third surface 313 is not. On the first surface 311, the letters B and C can be at least partially seen, whereas the letter A is not in the field-of-view of the left eye 411*a*. Similarly, on the second surface 312, the letters E, F, and G can be seen.

Figure 5B:
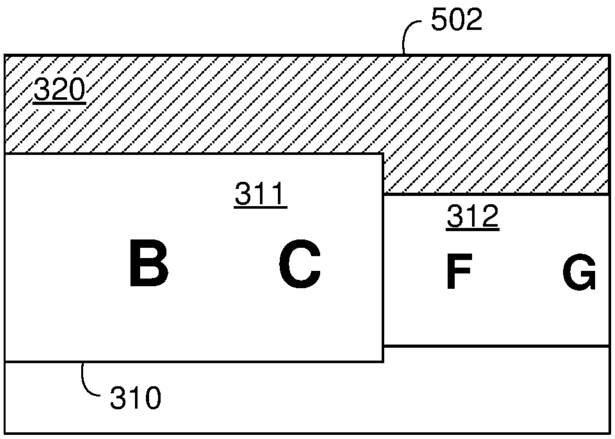
FIG. 5B illustrates a first image of the physical environment of FIG. 3 captured by a left image sensor of the HMD.

FIG. 5B illustrates a first image 502 of the physical environment 301 captured by the left image sensor 421*a*. In the first image 502, like the view 501, the first surface 311 of the structure 310 and the second surface 312 of the structure 310 are present, but the third surface 313 is not. On the first surface 311, the letters B and C can be seen, whereas the letter A is not in the field-of-view of the left image sensor 421*a*. Similarly, on the second surface 312, the letters F and G can be seen, whereas the letter E is not in the field-of-view of the left image sensor 421*a*. Notably, in the first image 502, as compared to the view 501, the letter E is not present on the second surface 312. Thus, the letter E is in the field-of-view of the left eye 411*a*, but not in the field-of-view of the left image sensor 421*a*.

In various implementations, the HMD 420 transforms the first image 502 to make it appear as though it was captured from the left eye perspective rather than the left image sensor perspective, e.g., to appear as the view 501. In various implementations, the HMD 420 transforms the first image 502 based on depth values associated with first image 502 and a difference between the left image sensor perspective and the left eye perspective. In various implementations, the difference between the left image sensor perspective and the left eye perspective is determined during a calibration procedure. In various implementations, the depth value for a pixel of the image represents the distance from the left image sensor 421*a* to an object in the physical environment represented by the pixel. In various implementations, the depth values are used to generate a depth map including a respective depth value for each pixel of the first image 502.

Figure 6A:
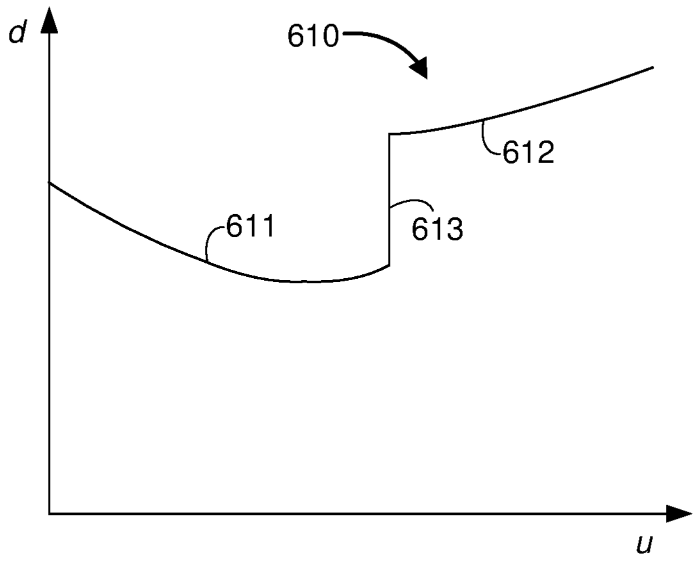
FIGS. 6A and 6B illustrate depth plot for a central row and central column of a depth map of the first image of FIG. 5B.

FIG. 6A illustrates a horizontal depth plot 610 for a central row of a depth map of the first image 502. The horizontal depth plot 610 includes a first portion 611 corresponding to the distance between the left scene camera 421A and various points on the first surface 311 of the structure 310 and a second portion 912 corresponding to the distance between the left scene camera 421A and various points on the second surface 312 of the structure. The horizontal depth plot 610 further includes a horizontal discontinuity 613 between the last point of the first portion 611 and the first point of the second portion 612.

Figure 6B:
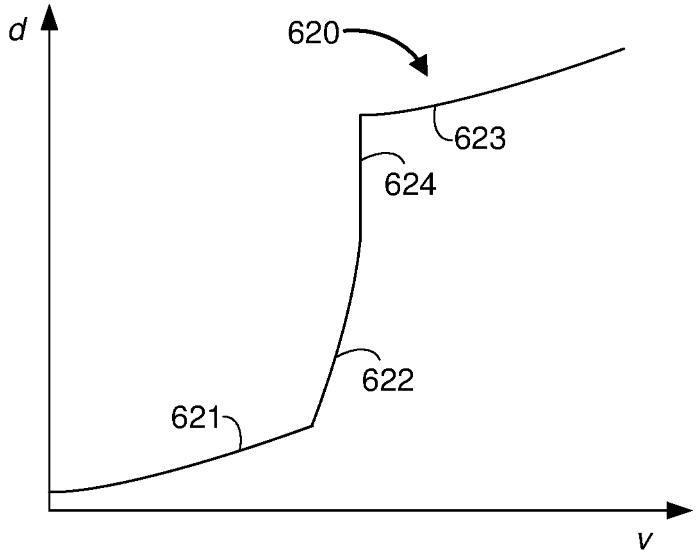

FIG. 6B illustrates a vertical depth plot 620 for a central column of the depth map of the first image 502. The vertical depth plot 620 includes a first portion 621 corresponding to the distance between the left scene camera 421A and various points on the ground between the left scene camera 421A and the structure 310, a second portion 622 corresponding to the distance between the left scene camera 421A and various points on the structure 310, and a third portion 623 corresponding to the distance between the left scene camera 421A and various points on the wall 320. The vertical depth plot 620 further includes a vertical discontinuity 624 between the last point of the second portion 622 and the first point of the third portion 623.

Figure 7:
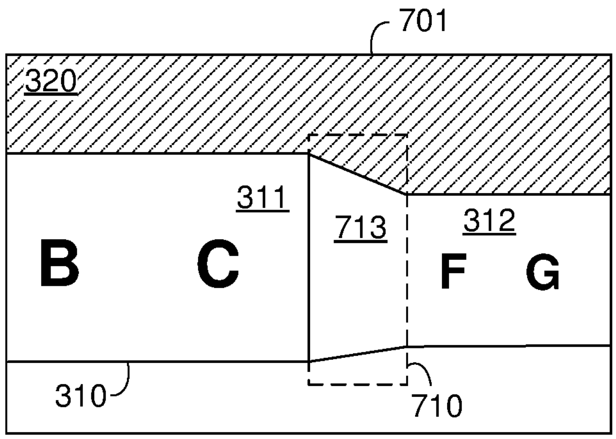
FIG. 7 illustrates a first transformed image generated by transforming the first image of 5B based on the depth map of the first image.

FIG. 7 illustrates a first transformed image 701 generated by transforming the first image 502 based on the depth map of the first image 701 and a difference between the left scene camera perspective and the left eye perspective. In various implementations, the transformation is a projective transformation.

In the first transformed image 701, the first surface 311 of the structure 310 and the second surface 312 of the structure 310 are present. On the first surface 311, the letters B and C can be seen at generally the same size and location as in the view 501. Similarly, on the second surface 312, the letters F and G can be seen at generally the same size and location as in the view 501. The projective transformation leaves a hole 710 in the first transformed image 701 corresponding to pixel locations for which the first image 502 provides no information. In various implementations, the pixel values for pixels in the hole can be determined using interpolation. Thus, in FIG. 7, the first transformed image 701 includes an artificial third surface 713 between the first surface 311 and the second surface 312.

Thus, whereas the view 501 does not include the third surface 313 of the structure, the first transformed image 701 incorrectly includes an artificial third surface 713 generated by interpolation. Further, whereas the view 501 includes the letter E on the second surface 312, the first transformed image 501 fails to include the letter E on the second surface 312.

In various implementations, holes are generated by discontinuities in the depth map. Accordingly, in various implementations, the depth map for the first image 502 is modified into a smooth depth map to reduce such discontinuities. In various implementations, the depth map is modified such that the difference between any two adjacent elements of the smooth depth map is below a threshold. In various implementations, the depth map is modified such that the difference between any two horizontally adjacent elements of the smooth depth map is below a horizontal threshold and the difference between any two vertically adjacent elements of the smooth depth map is below a vertical threshold. Thus, in various implementations, the depth map is smoothed more in a vertical direction than a horizontal direction.

In various implementations, the depth map is modified by applying a two-dimensional low-pass filter to the depth map. In various implementations, a horizontal cutoff of the low-pass filter is less than a vertical cutoff of the low-pass filter. Thus, as noted above, in various implementations, the depth map is smoothed more in a vertical direction than a horizontal direction.

Figure 8A:
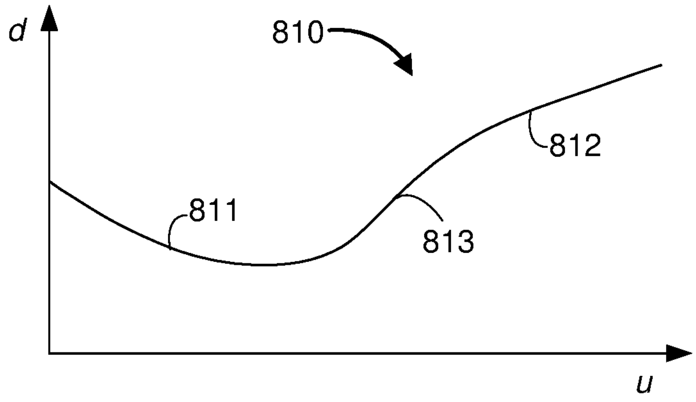
FIGS. 8A and 8B illustrate smooth depth plots for a central row and central column of a smooth depth map of the first image of FIG. 5B.

FIG. 8A illustrates a smooth horizontal depth plot 810 for a central row of a smooth depth map of the first image 502. The smooth horizontal depth plot 810 includes a first portion 811 corresponding to the distance between the left scene camera 421A and various points on the first surface 311 of the structure 310 and a second portion 812 corresponding to the distance between the left scene camera 421A and various points on the second surface 312 of the structure 310. However, rather than meeting at a discontinuity (e.g., the horizontal discontinuity 613 of FIG. 6A), the first portion 811 and second portion 812 are connected by a slope 813. Thus, the difference between any two adjacent points of the smooth horizontal depth plot 810 is below a horizontal threshold, e.g., is less than an amount that would generate a hole in the transformed image.

Figure 8B:
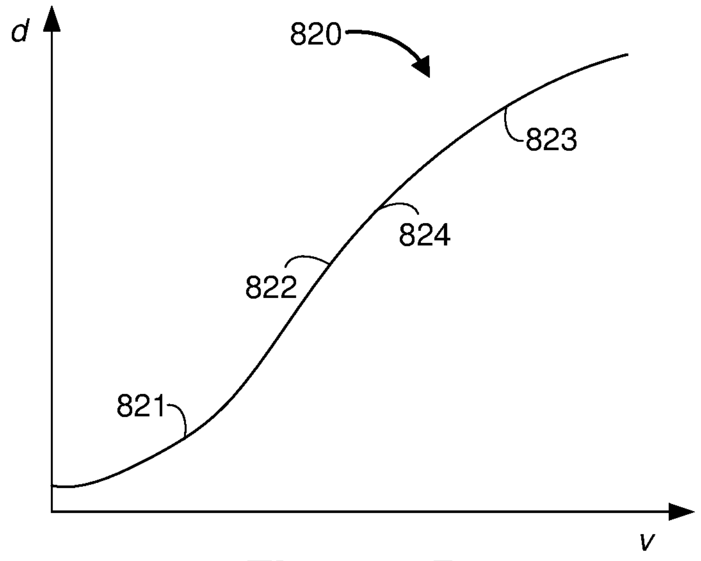

FIG. 8B illustrates a smooth vertical depth plot 820 for a central column of the smooth depth map of the first image 502. The smooth vertical depth plot 820 includes a first portion 821 corresponding to the distance between the left scene camera 421A and various points on the ground between the left scene camera 421A and the structure 310, a second portion 822 corresponding to the distance between the left scene camera 421A and various points on the structure 310, and a third portion 823 corresponding to the distance between the left scene camera 421A and various points on the wall 320. However, rather than meeting at a discontinuity (e.g., the vertical discontinuity 624 of FIG. 6B), the second portion 822 and third portion 823 are connected by a slope 824. Thus, the difference between any two adjacent points of the smooth vertical depth plot 820 is below a vertical threshold, e.g., is less than an amount that would generate a hole in the transformed image.

Figure 9:
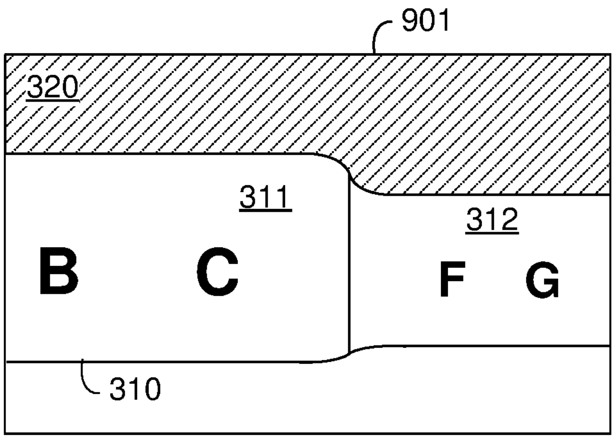
FIG. 9 illustrates a second transformed image generated by transforming the first image of 5B based on the smooth depth map of the first image.

FIG. 9 illustrates a second transformed image 901 generated by transforming the first image 502 based on a smooth depth map of the first image 502 and a difference between the left scene camera perspective and the left eye perspective. In the second transformed image 901, the first surface 311 of the structure 310 and the second surface 312 of the structure 310 are present. On the first surface 311, the letters B and C can be seen at generally the same size and location as in the view 501. Similarly, on the second surface 312, the letters F and G can be seen at generally the same size and location as in the view 501.

As compared to FIG. 7, the second transformed image 901 does not include a hole or an artificial third surface generated by interpolation. However, whereas the view 501 includes the letter E on the second surface 312, the transformed image 801 fails to include the letter E on the second surface 312 as the letter E was not captured by the first image 501. However, every other letter is present at generally the same size and location as in the view 501 even though the letters B and C are present at a different distance than the letters F and G.

Figure 10A:
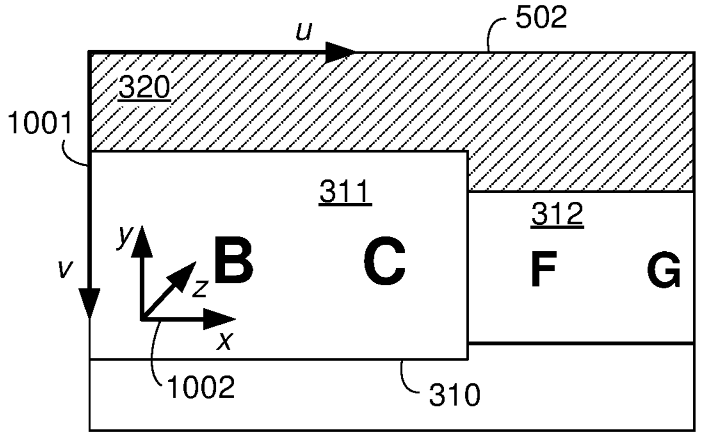
FIG. 10A illustrates the first image of FIG. 5B with axes of an image coordinate system and a world coordinate system.

FIG. 10A illustrates the first image 502 with axes of coordinate systems overlaid thereon. FIG. 10A illustrates image axes 1001 of an image coordinate system. The image coordinate system is a two-dimensional coordinate system in the image space of the first image 502. The image coordinate system includes a vertical v-axis and a horizontal u-axis perpendicular to the v-axis. FIG. 10A illustrates world axes 1002 of a world coordinate system. The world coordinate system is a three-dimensional coordinate system in the world space of the physical environment 301. The world coordinate system includes a vertical y-axis, a horizontal x-axis perpendicular to the y-axis, and a horizontal z-axis perpendicular to both the y-axis and the x-axis.

In various implementations, the y-axis is aligned with a gravity vector of the physical environment 301. In various implementations, the HMD 420 determines the gravity vector using an inertial measurement unit (IMU). In various implementations, the HMD 420 determines the gravity vector based on analysis of the image (e.g., perpendicular to the ground of the physical environment or parallel to the structure 310).

In FIG. 10A, a projection of the y-axis of the world coordinate system into the image space is parallel with the vertical v-axis of the image coordinate system. Accordingly, in various implementations, to transform the first image 502, the depth map of the first image 502 is smoothed maximally in the vertical v-axis direction and minimally in the horizontal u-axis direction.

Figure 10B:
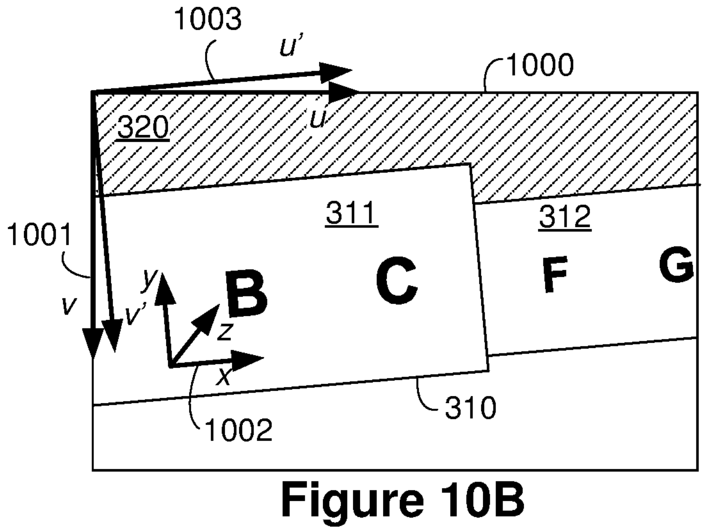
FIG. 10B illustrates a second image of the physical environment of FIG. 3 captured by the left image sensor of the HMD with the axes of the image coordinate system and the world coordinate system.

FIG. 10B illustrates a second image 1000 of the physical environment 301 captured by the left image sensor 421*a* from a second perspective different than a first perspective at which the first image 502 was captured. In particular, the second perspective is rotated as compared to the first perspective. FIG. 10B illustrates the image axes 1001 of the image coordinate system of the second image 1000 and the world axes 1002 of the world coordinate system of the physical environment 301. Notably, the world axes 1002 in FIG. 10B are rotated as compared to FIG. 10A.

In FIG. 10B, a projection of the y-axis of the world coordinate system into the image space is not parallel with the vertical v-axis of the image coordinate system. Rather, the projection of the y-axis is parallel to a projected vertical v-axis of a rotated image coordinate system illustrated by rotated image axes 1003. The rotated image coordinate system is a two-dimensional coordinate system in image space of the second image 1000. The rotated image coordinate system includes a projected vertical v-axis and a projected horizontal u-axis perpendicular to the projected vertical v-axis. Further, the projected vertical v-axis is at a non-zero angle to the vertical v-axis. Accordingly, in various implementations, to transform the second image 1000, the depth map of the second image 1000 is smoothed maximally in the projected vertical v-axis direction and minimally in the projected horizontal u-axis direction.

Figure 11A:
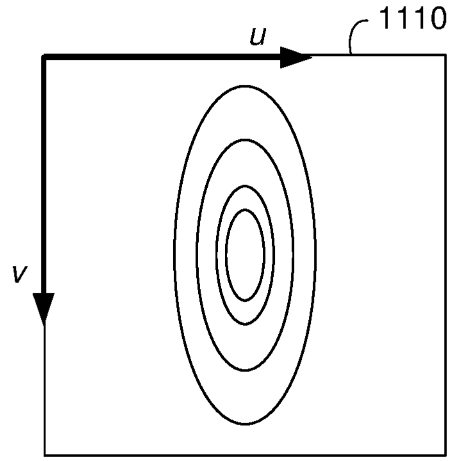
FIGS. 11A and 11B illustrate filter kernels for the first image of FIG. 5B and the second image of FIG. 10B.
Figure 11B:
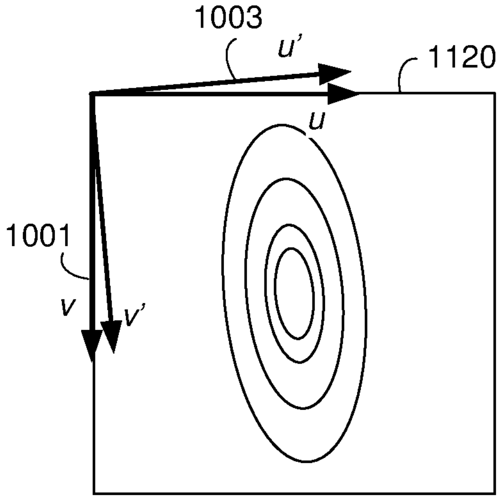

FIG. 11A illustrates a first contour plot 1110 of a filter kernel for smoothing the depth map of the first image 502. In various implementations, the filter kernel is an anisotropic Gaussian filter kernel with a largest width along the vertical v-axis and a smallest width along the horizontal u-axis. FIG. 11B illustrates a second contour plot 1120 of a filter kernel for smoothing the depth map of the second image 1000. In various implementations, the filter kernel is an anisotropic Gaussian filter kernel with a largest width along the projected vertical v-axis and a smallest width along the projected horizontal u-axis. In various implementations, the filter kernel for smoothing the depth map of the second image 1000 is a rotated version of the filter kernel for smoothing the depth map of the first image 502.

Figure 12:
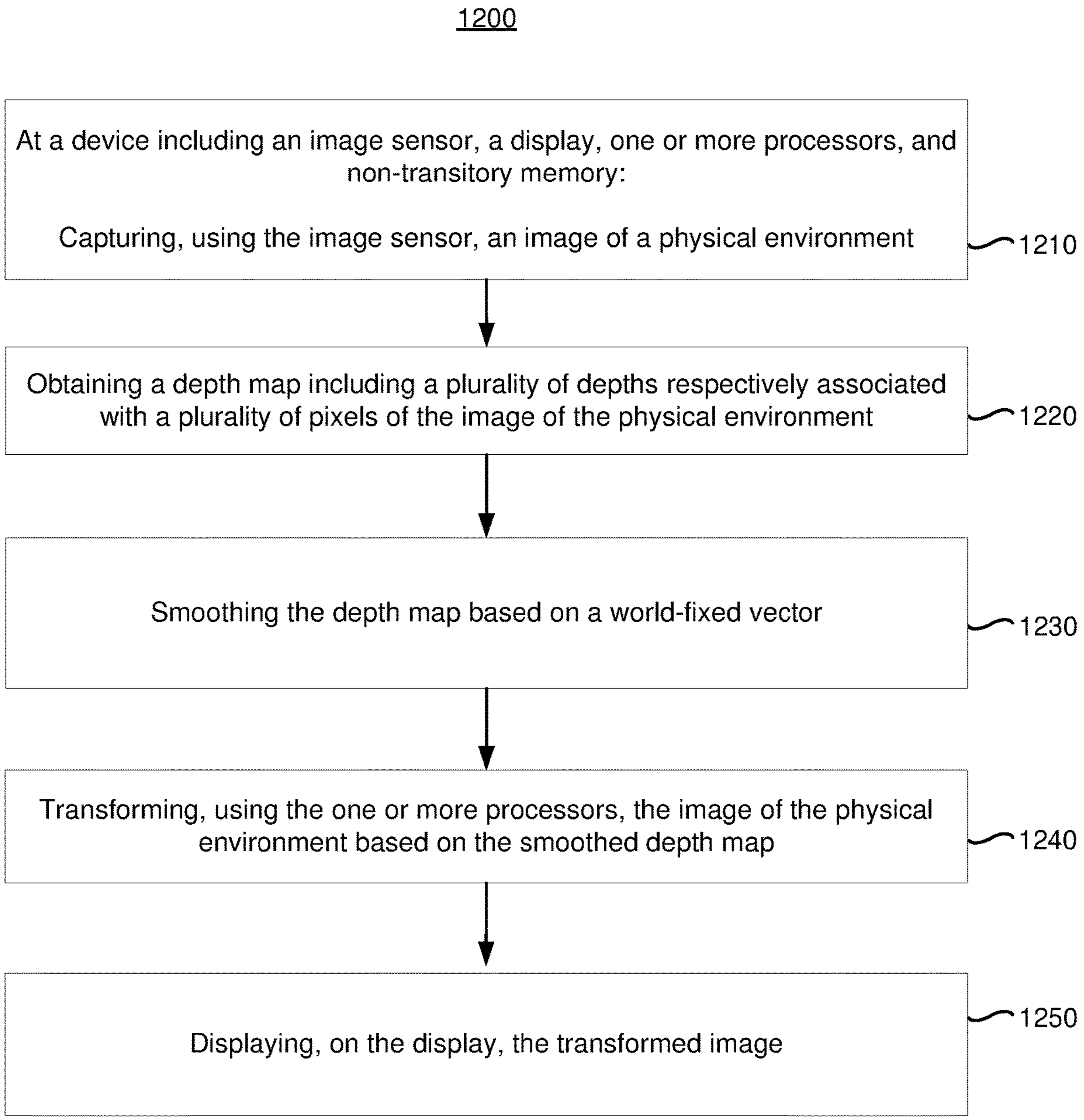
FIG. 12 is a flowchart representation of a method of performing perspective correction in accordance with some implementations.

FIG. 12 is a flowchart representation of a method of performing perspective correction of an image in accordance with some implementations. In various implementations, the method 1200 is performed by a device with an image sensor, a display, one or more processors, and non-transitory memory (e.g., the electronic device 120 of FIG. 1). In some implementations, the method 1200 is performed by processing logic, including hardware, firmware, software, or a combination thereof. In some implementations, the method 1200 is performed by a processor executing instructions (e.g., code) stored in a non-transitory computer-readable medium (e.g., a memory).

The method 1200 begins, in block 1210, with the device capturing, using the image sensor, an image of a physical environment.

The method 1200 continues, in block 1220, with the device obtaining a depth map including a plurality of depths respectively associated with a plurality of pixels of the image of the physical environment. In various implementations, the depth map includes a dense depth map which represents, for each pixel of the image, an estimated distance between the image sensor and an object represented by the pixel. In various implementations, the depth map includes a sparse depth map which represents, for each of a subset of the pixels of the image, an estimated distance between the image sensor and an object represented by the pixel. In various implementations, the device generates a sparse depth map from a dense depth map by sampling the dense depth map, e.g., selecting a single pixel in every N×N block of pixels.

In various implementations, the device obtains the plurality of depths from a depth sensor. In various implementations, the device obtains the plurality of depths using stereo matching, e.g., using the image of the physical environment as captured by a left scene camera and another image of the physical environment captured by a right scene camera. In various implementations, the device obtains the plurality of depths through eye tracking, e.g., the intersection of the gaze directions of the two eyes of the user indicates the depth of an object at which the user is looking.

In various implementations, the device obtains the plurality of depths from a three-dimensional scene model of the physical environment, e.g., via ray tracing from the image sensor to various features of the three-dimensional scene model.

The method 1200 continues, in block 1230, with the device smoothing the depth map based on a world-fixed vector. In various implementations, the world-fixed vector is a vector in a three-dimensional coordinate system of the physical environment that is independent of an orientation of the device. In various implementations, the world-fixed vector is a gravity vector of the physical environment. In various implementations, the world-fixed vector is a vector parallel or perpendicular to an object in the physical environment, e.g., perpendicular to a table or the ground or parallel to an intersection between two walls.

In various implementations, smoothing the depth map based on the world-fixed vector includes determining a smoothing direction for the first image of the physical environment corresponding to the world-fixed vector. In various implementations, determining the smoothing direction includes determining the world-fixed vector. In various implementations, determining the world-fixed vector includes determining the world-fixed vector (e.g., a gravity vector) using an inertial measurement unit (IMU). In various implementations, determining the smoothing direction includes determining a projection of the world-fixed vector into an image space of the image of the physical environment. In various implementations, determining the projection includes projecting the world-fixed vector into the image space. In various implementations, determining the projection includes performing image analysis of the image of the physical environment. For example, in various implementations, determining the projection of the world-fixed vector includes performing edge detection and selecting the projection of the world-fixed vector as the average direction of nearly vertical edges.

In various implementations, the smoothing direction forms an angle with a vertical vector (e.g., the vertical v-axis) in the image space. In various implementations, the angle is non-zero. In various implementations, the angle for a first image (e.g., a first image captured at a first time and/or perspective) is different than the angle for a second image (e.g., a second image captured at a second time and/or perspective).

In various implementations, the depth map is maximally smoothed in the smoothing direction more than a direction perpendicular to the smoothing direction. In various implementations, smoothing the depth map includes applying an anisotropic filter to the depth map. In various implementations, the anisotropic filter is a Gaussian filter. In various implementations, applying the anisotropic filter includes rotating an anisotropic filter kernel by the angle (e.g., an angle between the smoothing direction and a vertical vector in the image space) and filtering the depth map with the rotated anisotropic filter kernel.

The method 1200 continues, in block 1240, with the device transforming, using the one or more processors, the image of the physical environment based on the smoothed depth map. In various implementations, the device transforms the image of the physical environment at an image pixel level, an image tile level, or a combination thereof.

In various implementations, the device transforms the image of the physical environment based on a difference between a first perspective of the image sensor and a second perspective. In various implementations, the second perspective is the perspective of a user, e.g., the perspective of an eye of the user. In various implementations, the second perspective is a perspective of a location closer to the eye of the user in one or more directions.

In various implementations, the device performs a projective transformation based on the smooth depth map and the difference between the first perspective of the image sensor and the second perspective.

In various implementations, the projective transformation is a forward mapping in which, for each pixel of the image of the physical environment at a pixel location in an untransformed space, a new pixel location is determined in a transformed space of the transformed image. In various implementations, the projective transformation is a backwards mapping in which, for each pixel of the transformed image at a pixel location in a transformed space, a source pixel location is determined in an untransformed space of the image of the physical environment.

In various implementations, the source pixel location is determined according to the following equation in which $x_1$ and $y_1$ are the pixel location in the untransformed space, $x_2$ and $y_2$ are the pixel location in the transformed space, $P_2$ is a 4×4 view projection matrix of the second perspective, $P_1$ is a 4×4 view projection matrix of the first perspective of the image sensor, and d is the smooth depth map value at the pixel location:

$$\begin{bmatrix} x_1 \\ y_1 \\ 1 \end{bmatrix} \leftarrow P_1 \cdot P_2^{-1} \cdot \begin{bmatrix} x_2 \\ y_2 \\ 1 \\ \left(\frac{1}{d}\right) \end{bmatrix}$$

In various implementations, the source pixel location is determined using the above equation for each pixel in the image of the physical environment. In various implementations, the source pixel location is determined using the above equation for less than each pixel of the image of the physical environment.

In various implementations, the device determines the view projection matrix of the second perspective and the view projection matrix of the first perspective during a calibration and stores data indicative of the view projection matrices (or their product) in a non-transitory memory. The product of the view projection matrices is a transformation matrix that represents a difference between the first perspective of the image sensor and the second perspective.

Thus, in various implementations, transforming the image of the physical environment includes determining, for a plurality of pixels of the transformed image having respective pixel locations, a respective plurality of source pixel locations. In various implementations, determining the respective plurality of source pixel locations includes, for each of the plurality of pixels of the transformed image, multiplying a vector including the respective pixel location and the multiplicative inverse of the respective element of the smooth depth map by a transformation matrix representing the difference between the first perspective of the image sensor and the second perspective.

Using the source pixel locations in the untransformed space and the pixel values of the pixels of the image of the physical environment, the device generates pixel values for each pixel location of the transformed image using interpolation or other techniques.

The method 1200 continues, in block 1260, with the device displaying, on the display, the transformed image. In various implementations, the transformed image includes XR content. In some implementations, XR content is added to the current image of the physical environment before the transformation (at block 1240). In some implementations, XR content is added to the transformed image. In various implementations, the device determines whether to add the XR content to the image of the physical environment before or after the transformation based on metadata indicative of the XR content's attachment to the physical environment. In various implementations, the device determines whether to add the XR content to the image of the physical environment before or after the transformation based on an amount of XR content (e.g., a percentage of the image of the physical environment containing XR content).

In various implementations, the device determines whether to add the XR content to the image of the physical environment before or after the transformation based on metadata indicative of a depth of the XR content. Accordingly, in various implementations, the method 1200 includes receiving XR content and XR content metadata, selecting the image of the physical environment or the transformed image based on the XR content metadata, and adding the XR content to the selection.

Figure 13:
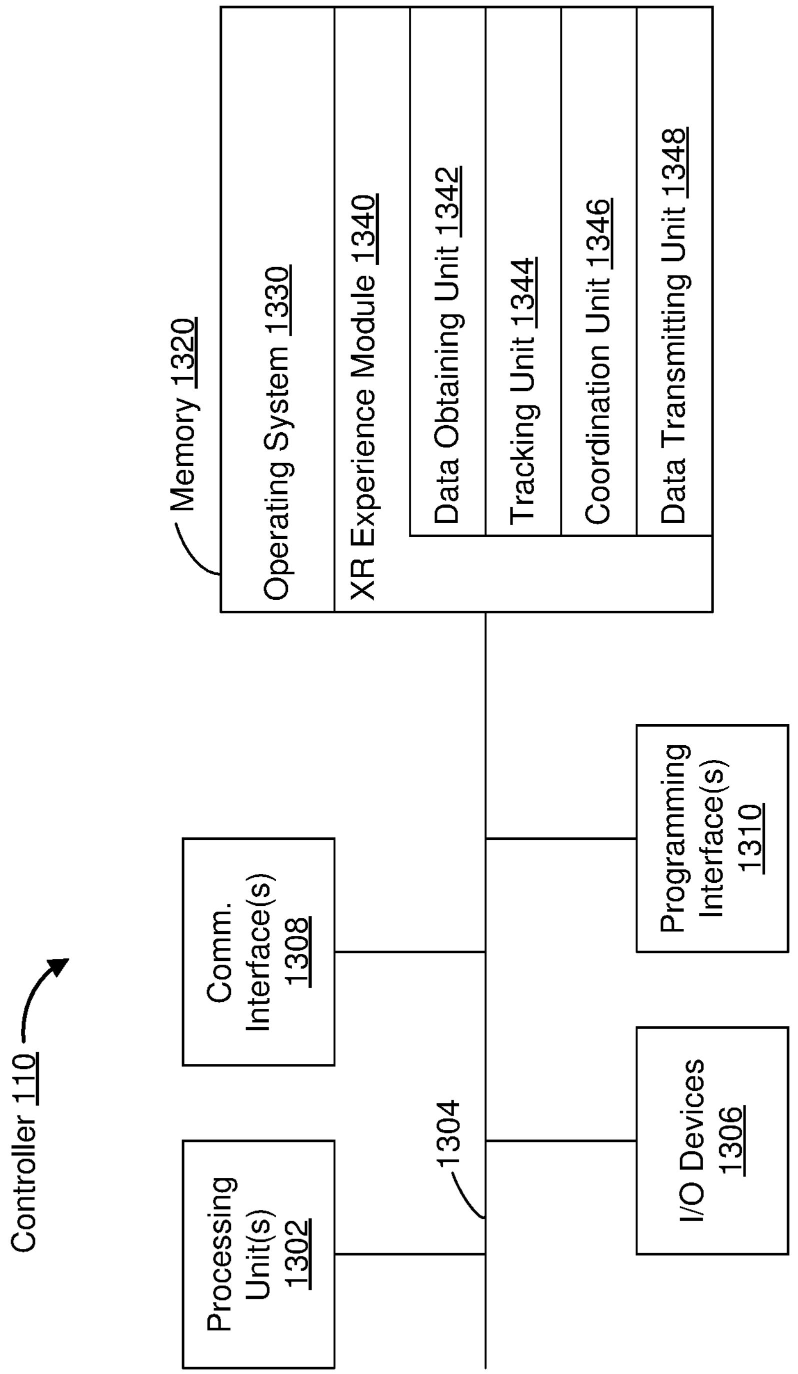
FIG. 13 is a block diagram of an example controller in accordance with some implementations.

FIG. 13 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 1302 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 1306, one or more communication interfaces 1308 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 1310, a memory 1320, and one or more communication buses 1304 for interconnecting these and various other components.

In some implementations, the one or more communication buses 1304 include circuitry that interconnects and controls communications between system components. In some implementations, the one or more I/O devices 1306 include at least one of a keyboard, a mouse, a touchpad, a joystick, one or more microphones, one or more speakers, one or more image sensors, one or more displays, and/or the like.

The memory 1320 includes high-speed random-access memory, such as dynamic random-access memory (DRAM), static random-access memory (SRAM), double-data-rate random-access memory (DDR RAM), or other random-access solid-state memory devices. In some implementations, the memory 1320 includes non-volatile memory, such as one or more magnetic disk storage devices, optical disk storage devices, flash memory devices, or other non-volatile solid-state storage devices. The memory 1320 optionally includes one or more storage devices remotely located from the one or more processing units 1302. The memory 1320 comprises a non-transitory computer readable storage medium. In some implementations, the memory 1320 or the non-transitory computer readable storage medium of the memory 1320 stores the following programs, modules and data structures, or a subset thereof including an optional operating system 1330 and an XR experience module 1340.

The operating system 1330 includes procedures for handling various basic system services and for performing hardware dependent tasks. In some implementations, the XR experience module 1340 is configured to manage and coordinate one or more XR experiences for one or more users (e.g., a single XR experience for one or more users, or multiple XR experiences for respective groups of one or more users). To that end, in various implementations, the XR experience module 1340 includes a data obtaining unit 1342, a tracking unit 1344, a coordination unit 1346, and a data transmitting unit 1348.

In some implementations, the data obtaining unit 1342 is configured to obtain data (e.g., presentation data, interaction data, sensor data, location data, etc.) from at least the electronic device 120 of FIG. 1. To that end, in various implementations, the data obtaining unit 1342 includes instructions and/or logic therefor, and heuristics and metadata therefor.

In some implementations, the tracking unit 1344 is configured to map the physical environment 105 and to track the position/location of at least the electronic device 120 with respect to the physical environment 105 of FIG. 1. To that end, in various implementations, the tracking unit 1344 includes instructions and/or logic therefor, and heuristics and metadata therefor.

In some implementations, the coordination unit 1346 is configured to manage and coordinate the XR experience presented to the user by the electronic device 120. To that end, in various implementations, the coordination unit 1346 includes instructions and/or logic therefor, and heuristics and metadata therefor.

In some implementations, the data transmitting unit 1348 is configured to transmit data (e.g., presentation data, location data, etc.) to at least the electronic device 120. To that end, in various implementations, the data transmitting unit 1348 includes instructions and/or logic therefor, and heuristics and metadata therefor.

Although the data obtaining unit 1342, the tracking unit 1344, the coordination unit 1346, and the data transmitting unit 1348 are shown as residing on a single device (e.g., the controller 110), it should be understood that in other implementations, any combination of the data obtaining unit 1342, the tracking unit 1344, the coordination unit 1346, and the data transmitting unit 1348 may be located in separate computing devices.

Moreover, FIG. 13 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 13 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 14:
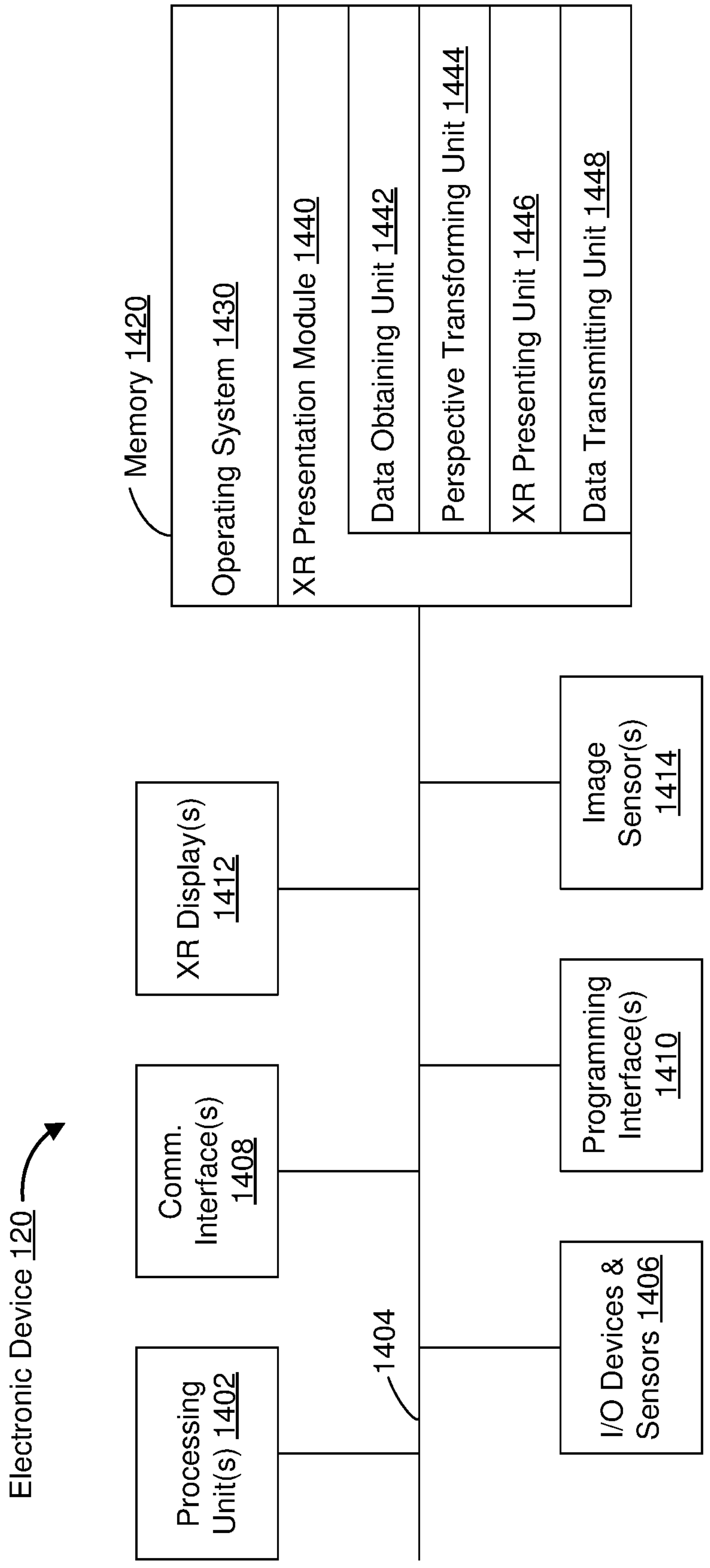
FIG. 14 is a block diagram of an example electronic device in accordance with some implementations.

FIG. 14 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 1402 (e.g., microprocessors, ASICs, FPGAs, GPUs, CPUs, processing cores, and/or the like), one or more input/output (I/O) devices and sensors 1406, one or more communication interfaces 1408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1410, one or more XR displays 1412, one or more optional interior- and/or exterior-facing image sensors 1414, a memory 1420, and one or more communication buses 1404 for interconnecting these and various other components.

In some implementations, the one or more communication buses 1404 include circuitry that interconnects and controls communications between system components. In some implementations, the one or more I/O devices and sensors 1406 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 1412 are configured to provide the XR experience to the user. In some implementations, the one or more XR displays 1412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 1412 correspond to diffractive, reflective, polarized, holographic, etc. waveguide displays. For example, the electronic device 120 includes a single XR display. In another example, the electronic device includes an XR display for each eye of the user. In some implementations, the one or more XR displays 1412 are capable of presenting MR and VR content.

In some implementations, the one or more image sensors 1414 are configured to obtain image data that corresponds to at least a portion of the face of the user that includes the eyes of the user (any may be referred to as an eye-tracking camera). In some implementations, the one or more image sensors 1414 are configured to be forward-facing so as to obtain image data that corresponds to the physical environment as would be viewed by the user if the electronic device 120 was not present (and may be referred to as a scene camera). The one or more optional image sensors 1414 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 1420 includes high-speed random-access memory, such as DRAM, SRAM, DDR RAM, or other random-access solid-state memory devices. In some implementations, the memory 1420 includes non-volatile memory, such as one or more magnetic disk storage devices, optical disk storage devices, flash memory devices, or other non-volatile solid-state storage devices. The memory 1420 optionally includes one or more storage devices remotely located from the one or more processing units 1402. The memory 1420 comprises a non-transitory computer readable storage medium. In some implementations, the memory 1420 or the non-transitory computer readable storage medium of the memory 1420 stores the following programs, modules and data structures, or a subset thereof including an optional operating system 1430 and an XR presentation module 1440.

The operating system 1430 includes procedures for handling various basic system services and for performing hardware dependent tasks. In some implementations, the XR presentation module 1440 is configured to present XR content to the user via the one or more XR displays 1412. To that end, in various implementations, the XR presentation module 1440 includes a data obtaining unit 1442, a perspective transforming unit 1444, an XR presenting unit 1446, and a data transmitting unit 1448.

In some implementations, the data obtaining unit 1442 is configured to obtain data (e.g., presentation data, interaction data, sensor data, location data, etc.) from at least the controller 110 of FIG. 1. To that end, in various implementations, the data obtaining unit 1442 includes instructions and/or logic therefor, and heuristics and metadata therefor.

In some implementations, the perspective transforming unit 1444 is configured to transform an image based on an anisotropically smoothed depth map. To that end, in various implementations, the perspective transforming unit 1444 includes instructions and/or logic therefor, and heuristics and metadata therefor.

In some implementations, the XR presenting unit 1446 is configured to display the transformed image via the one or more XR displays 1412. To that end, in various implementations, the XR presenting unit 1446 includes instructions and/or logic therefor, and heuristics and metadata therefor.

In some implementations, the data transmitting unit 1448 is configured to transmit data (e.g., presentation data, location data, etc.) to at least the controller 110. In some implementations, the data transmitting unit 1448 is configured to transmit authentication credentials to the electronic device. To that end, in various implementations, the data transmitting unit 1448 includes instructions and/or logic therefor, and heuristics and metadata therefor.

Although the data obtaining unit 1442, the perspective transforming unit 1444, the XR presenting unit 1446, and the data transmitting unit 1448 are shown as residing on a single device (e.g., the electronic device 120), it should be understood that in other implementations, any combination of the data obtaining unit 1442, the perspective transforming unit 1444, the XR presenting unit 1446, and the data transmitting unit 1448 may be located in separate computing devices.

Moreover, FIG. 14 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 14 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms “first,” “second,” etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the “first node” are renamed consistently and all occurrences of the “second node” are renamed consistently. The first node and the second node are both nodes, but they are not the same node.

The terminology used herein is for the purpose of describing particular implementations only and is not intended to be limiting of the claims. As used in the description of the implementations and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “if” may be construed to mean “when” or “upon” or “in response to determining” or “in accordance with a determination” or “in response to detecting,” that a stated condition precedent is true, depending on the context. Similarly, the phrase “if it is determined [that a stated condition precedent is true]” or “if [a stated condition precedent is true]” or “when [a stated condition precedent is true]” may be construed to mean “upon determining” or “in response to determining” or “in accordance with a determination” or “upon detecting” or “in response to detecting” that the stated condition precedent is true, depending on the context.

What is claimed is:

1. A method comprising:

at a device including an image sensor, a display, one or more processors, and non-transitory memory:

capturing, using the image sensor, an image of a physical environment;

obtaining a depth map including a plurality of depths respectively associated with a plurality of pixels of the image of the physical environment, wherein one or more depth plots of the depth map indicate one or more discontinuities;

smoothing the depth map to reduce the one or more discontinuities in the one or more depth plots based on a world-fixed vector, including modifying the depth map in a first direction aligned with the world-fixed vector more than modifying the depth map in a second direction that is not aligned with the world-fixed vector and reducing a difference between two adjacent elements of the depth map to be below a threshold;

transforming, using the one or more processors, the image of the physical environment based on the smoothed depth map; and displaying, on the display, the transformed image.

2. The method of claim 1, wherein the world-fixed vector is a gravity vector of the physical environment.

3. The method of claim 1, wherein the world-fixed vector is a vector parallel or perpendicular to an object in the physical environment.

4. The method of claim 1, further comprising determining a smoothing direction for the image of the physical environment corresponding to the world-fixed vector, wherein the depth map is maximally smoothed in the smoothing direction more than in a direction perpendicular to the smoothing direction.

5. The method of claim 4, wherein determining the smoothing direction includes determining the world-fixed vector.

6. The method of claim 5, wherein determining the world-fixed vector includes determining the world-fixed vector using an inertial measurement unit.

7. The method of claim 4, wherein determining the smoothing direction includes determining a projection of the world-fixed vector into an image space of the image of the physical environment.

8. The method of claim 7, wherein determining the projection of the world-fixed vector includes projecting the world-fixed vector into the image space.

9. The method of claim 7, wherein determining the projection of the world-fixed vector includes performing image analysis of the image of the physical environment.

10. The method of claim 4, wherein the smoothing direction forms an angle with a vertical vector in an image space of the image of the physical environment.

11. The method of claim 10, wherein the angle is non-zero.

12. The method of claim 10, wherein the angle is different than a second angle between a vertical vector in an image space of a second image of the physical environment and a second smoothing direction of the second image of the physical environment.

13. The method of claim 1, wherein smoothing the depth map includes applying an anisotropic filter to the depth map.

14. The method of claim 13, wherein the anisotropic filter is a Gaussian filter.

15. The method of claim 13, wherein applying the anisotropic filter includes rotating an anisotropic filter kernel by an angle between a smoothing direction and a vertical vector in an image space of the image of the physical environment and filtering the depth map with the rotated anisotropic filter kernel.

16. A device comprising:
- an image sensor;
- a display;
- a non-transitory memory; and
- one or more processors to:
  - capture, using the image sensor, an image of a physical environment;
  - obtain a depth map including a plurality of depths respectively associated with a plurality of pixels of the image of the physical environment, wherein one or more depth plots of the depth map indicate one or more discontinuities;
  - rotate an anisotropic filter kernel by an angle based on a vector that is independent of an orientation of the device;
  - filter the depth map using the rotated anisotropic filter kernel to reduce the one or more discontinuities in the one or more depth plots;
  - transform, using the one or more processors, the image of the physical environment based on the filtered depth map; and
  - display, on the display, the transformed image.

17. The device of claim 16, wherein the vector is a gravity vector of the physical environment.

18. The device of claim 16, wherein the vector is a vector parallel or perpendicular to an object in the physical environment.

19. The device of claim 16, wherein the anisotropic filter kernel is a Gaussian filter kernel.

20. A non-transitory computer-readable memory having instructions encoded thereon which, when executed by one or more processors of a device including an image sensor and a display, cause the device to:
- capture, using the image sensor, a first image of a physical environment;
- obtain a first depth map including a plurality of depths respectively associated with a plurality of pixels of the first image of the physical environment, wherein a first depth plot of the first depth map indicates a first set of discontinuities;
- determine a first smoothing direction for the first image of the physical environment corresponding to a world-fixed vector to reduce the first set of discontinuities, wherein the first smoothing direction is aligned with the world-fixed vector;
- smooth the first depth map based on the first smoothing direction, including modifying the first depth map in the first smoothing direction;
- transform, using the one or more processors, the first image of the physical environment based on the smoothed first depth map;
- display, on the display, the transformed first image;
- capture, using the image sensor, a second image of a physical environment;
- obtain a second depth map including a plurality of depths respectively associated with a plurality of pixels of the second image of the physical environment, wherein a second depth plot of the second depth map indicates a second set of discontinuities;
- determine a second smoothing direction for the second image of the physical environment corresponding to the world-fixed vector to reduce the second set of discontinuities, wherein the second smoothing direction is different than the first smoothing direction;
- smooth the second depth map based on the second smoothing direction, including modifying the second depth map in the second smoothing direction less than modifying the first depth map in the first smoothing direction;
- transform, using the one or more processors, the second image of the physical environment based on the smoothed second depth map; and
- display, on the display, the transformed second image.

* * * * *